US012734880B2

(12) United States Patent
Houser et al.

(10) Patent No.: US 12,734,880 B2
(45) **Date of Patent: *Sep. 15, 2026**

(54) TANDEM TIRE WEAR TORQUE CONTROL

(71) Applicant: PACCAR Inc, Bellevue, WA (US)

(72) Inventors: Jordan Michael Houser, Lewisville, TX (US); Benjamin Thomas Grover, Tacoma, WA (US); Charles Wayne Reinhardt Swart, Bellingham, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/058,228

(22) Filed: Feb. 20, 2025

(65) Prior Publication Data

US 2025/0187434 A1 Jun. 12, 2025

Related U.S. Application Data

(63) Continuation of application No. 18/345,419, filed on Jun. 30, 2023, now Pat. No. 12,257,895.

(51) Int. Cl.
*B60C 11/24* (2006.01)
*B60K 23/08* (2006.01)

(52) U.S. Cl.
CPC ........ *B60K 23/0808* (2013.01); *B60C 11/246* (2013.01); *B60K 2023/0858* (2013.01); (Continued)

(58) Field of Classification Search
CPC ........ B60K 23/0808; B60K 2023/0858; B60C 11/246; B60W 2300/145; B60W 2520/403; B60W 2520/406; B60W 2530/20; B60W 2540/10; B60W 2720/403; B60W 2720/406
See application file for complete search history.

(56) References Cited

U.S. PATENT DOCUMENTS

| | | | | |
|---|---|---|---|---|
| 12,257,895 | B2 * | 3/2025 | Houser .............. | B60K 23/0808 |
| 2007/0112477 | A1 | 5/2007 | Van Zanten et al. | |

(Continued)

FOREIGN PATENT DOCUMENTS

| | | | |
|---|---|---|---|
| CN | 107107746 | A | 8/2017 |
| DE | 102019205215 | B3 | 9/2020 |

(Continued)

OTHER PUBLICATIONS

European Search Report EP Application No. 24 17 11 26 mailed Oct. 21, 2024 (8 pages).

(Continued)

*Primary Examiner* — Justin Holmes

(57) ABSTRACT

The present disclosure relates to systems and methods of automatically distributing powertrain demand between tandem drive axles in a tandem drive axle system for balanced tire wear between the tandem drive axles. Examples described herein analyze input signals collected from various vehicle sensors about operating conditions of the front and back tandem drive axles, and automatically bias a distribution of torque demand between the front and back tandem drive axles to correct for asymmetric wear based on known normal wear of the tires under like operating conditions.

20 Claims, 4 Drawing Sheets

(52) U.S. Cl.
CPC . *B60W 2300/145* (2013.01); *B60W 2520/403* (2013.01); *B60W 2520/406* (2013.01); *B60W 2530/20* (2013.01); *B60W 2540/10* (2013.01); *B60W 2720/403* (2013.01); *B60W 2720/406* (2013.01)

(56) References Cited

U.S. PATENT DOCUMENTS

| | | | |
|---|---|---|---|
| 2019/0351895 | A1 | 11/2019 | Ben-Ari |
| 2022/0144058 | A1 | 5/2022 | Ben-Ari |
| 2022/0402474 | A1 | 12/2022 | Zanten et al. |

FOREIGN PATENT DOCUMENTS

| | | | | |
|---|---|---|---|---|
| EP | 1 188 597 | A2 | 3/2002 | |
| EP | 4613596 | A1 * | 9/2025 | ........... B60C 11/246 |
| JP | H05-69811 | A | 3/1993 | |

OTHER PUBLICATIONS

Yamakawa et al. "A method of optimal wheel torque determination for independent wheel drive vehicles," Journal of Terramechanics, vol. 43 (2006) pp. 269-285.
Jones et al. "Active Limitation of Tire of Wear and Emissions for Electrified Vehicles," SAE Technical Paper, 2021, pp. 1-9.
Communication pursuant to Article 94(3) EPC for corresponding European Patent Application No. 24171126.6 mailed May 11, 2026, 4 pages.

* cited by examiner

VEHICLE 102

TIRE WEAR TORQUE CONTROL SYSTEM 105

SENSORS 106

POWERTRAIN CONTROLLER 108

TIRE WEAR TORQUE CONTROLLER 110

TANDEM DRIVE AXLE ASSEMBLY 134

FRONT AXLE CONTROL SYSTEM 104

REAR AXLE CONTROL SYSTEM 144

FRONT AXLE 114

REAR AXLE 124

128

114

116a

116b

132a

132b

116e

116f

132e

132f

118

126

124

132c

132d

116c

116d

132g

132h

116g

116h

TANDEM TIRE WEAR TORQUE CONTROL

CROSS-REFERENCE TO RELATED APPLICATIONS

The present application is a continuation of U.S. patent application Ser. No. 18/345,419, filed on Jun. 30, 2023, the entire contents of which being hereby incorporated by reference.

BACKGROUND

Tandem drive axles refer to an axle configuration of a vehicle where two axles (e.g., a forward and a rear axle) are positioned closely together and where both axles receive power from the vehicle's engine or electrically powered motor(s), which is transferred to turn attached wheels. Tandem drive axles are frequently used across various vehicle types to increase a vehicle's traction and pulling power. For instance, in a large truck (e.g., Class 8 truck), the axle configuration may be a 6×4 configuration including three axles, where two axles are tandem drive axles. Typically, the tires of a front tandem drive axle and a back tandem drive axle wear at different rates. This can be due to various factors, such as uneven loading, where one axle may bear more weight than the other, torque, which may cause tires along one axle to spin faster than the others, tire scrub, which may occur when one or more tires are dragged or are otherwise slid across a driving surface, such as during turns, and/or other factors. Additionally, tires on one side of a tandem drive axle may wear at a different rate than tires on the other side of the tandem drive axle.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This disclosure generally relates to providing tandem tire wear torque control according to examples. In examples, tandem tire wear torque control reduces asymmetrical wear between tires of tandem axels in a tandem drive axle system. Accordingly, the tires wear at a more consistent rate, which reduces premature tire wear and replacement.

In an aspect, the technology relates to a method for providing balanced tire wear between tandem drive axles, comprising: receiving sensor input about an operating condition of a front axle and a rear axle of a tandem drive axle assembly of a vehicle; determining a balanced tire wear torque bias factor based on the operating condition; receiving a driver accelerator pedal request; calculating a torque request corresponding to an amount of torque to propel the vehicle based on the driver accelerator pedal request; determining a distribution of the torque request between the front axle and the rear axle; biasing the distribution based on the balanced tire wear torque bias factor; and requesting a biased amount of torque from the front axle and a biased amount of torque from the rear axle based on the biased distribution.

In another aspect, the technology relates to a system for providing balanced tire wear between tandem drive axles, comprising: at least one processor; and memory coupled to the at least one processor including instructions, which when executed, cause the system to: receive sensor input about an operating condition of a front axle and a rear axle of a tandem drive axle assembly of a vehicle; determine a balanced tire wear torque bias factor based on the operating condition; receive a driver accelerator pedal request; calculate a torque request corresponding to the driver accelerator pedal request; determine a distribution of the torque request between the front axle and the rear axle; bias the distribution of torque based on the balanced tire wear torque bias factor; and communicate a biased front axle torque request to the front axle and a biased rear axle torque request to the rear axle corresponding to the biased distribution of torque.

In another aspect, the technology relates to a vehicle comprising: a plurality of sensors; a tandem drive axle assembly, comprising: a front axle including a first set of tires; a rear axle including a second set of tires; at least one controller including: at least one processor; and a memory including instructions, which when executed by the at least one processor, cause the at least one controller to: receive inputs from the plurality of sensors about an operating condition of the front axle and the rear axle; determine a balanced tire wear torque bias factor based on the operating condition; receive a driver accelerator pedal request; calculate a torque request corresponding to the driver accelerator pedal request; determine a distribution of the torque request between the front axle and the rear axle; bias the distribution of torque based on the balanced tire wear torque bias factor; and communicate a biased front axle torque request to the front axle and a biased rear axle torque request to the rear axle corresponding to the biased distribution of torque.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1A:
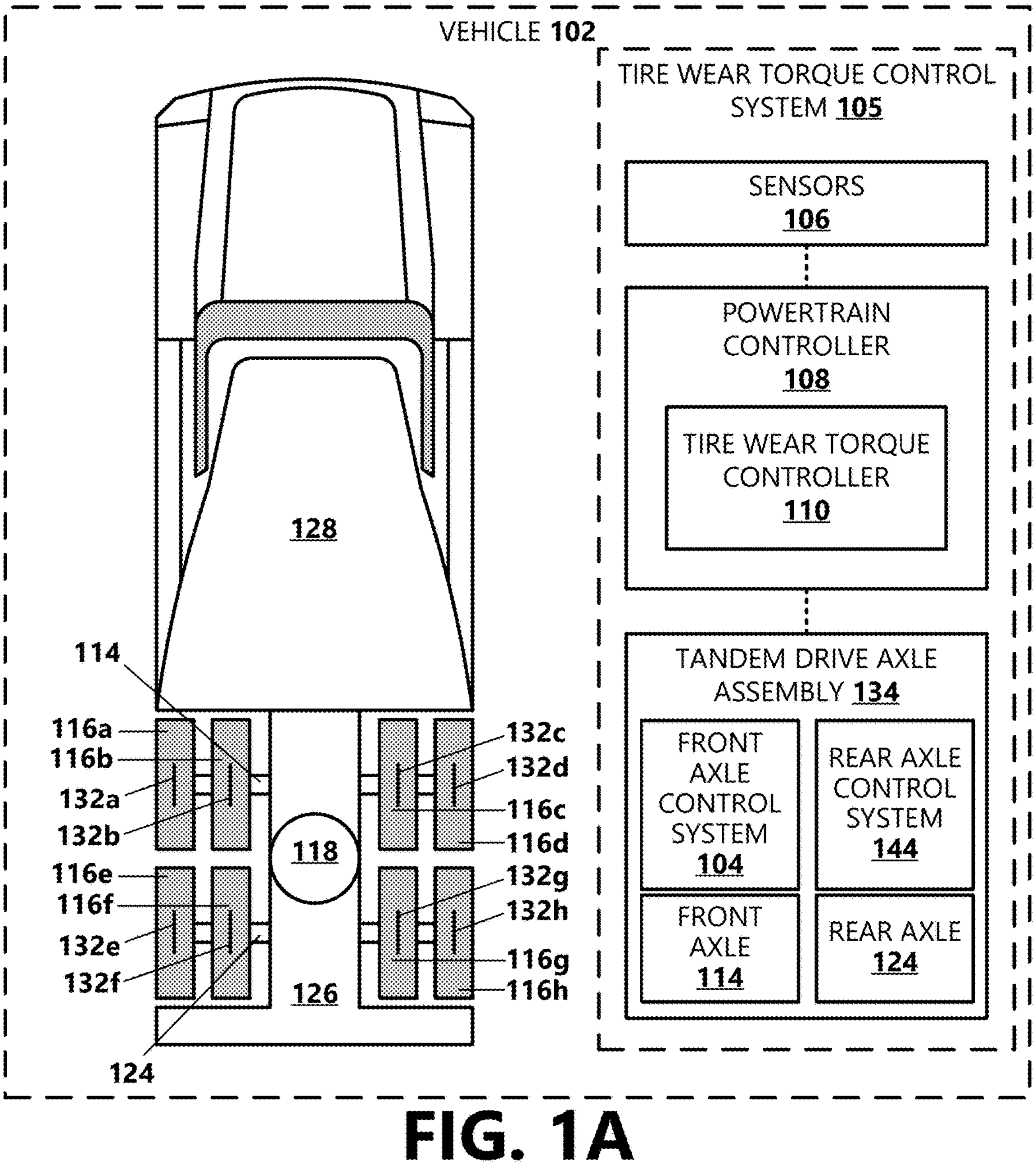
FIG. 1A is a conceptual illustration of a vehicle in which a tire wear torque control system may be implemented according to examples.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. The following detailed description is, therefore, not to be taken in a limiting sense.

The present disclosure relates to systems and methods of providing automated torque biasing for balanced tire wear between the tandem drive axles. Examples described herein mitigate uneven tire wear experienced between the front and back tires on tandem drive axles that can occur due to various factors, such as uneven loading, torque, and/or tire scrub. In addition to the expense and environment impact of replacing unevenly worn tires, uneven wear of tires can cause various effects on the vehicle's performance and handling. For instance, uneven tire wear can result in reduced traction, which can further affect the vehicle's acceleration and braking capabilities and overall stability. Additionally, uneven tire wear on tandem drive axles can cause an increased acceleration of tire wear. For instance, as tires continue to wear unevenly, a feedback loop can occur, where the more worn tires (e.g., rear tires) experience increased stress, which leads to even further premature and uneven tire wear. A tandem axle tire wear torque control system and method include automatically biasing torque demand to reduce uneven tire wear between the front and back tandem drive axles. Examples described herein include analyzing input signals collected from various vehicle sensors about operating conditions of the front and back tandem drive axles, and automatically biasing a distribution of torque demand between the front and back tandem drive axles to correct for asymmetric wear based on known normal wear of the tires under like operating conditions. These and other examples are discussed below with reference to FIGS. 1-4.

Figure 1B:
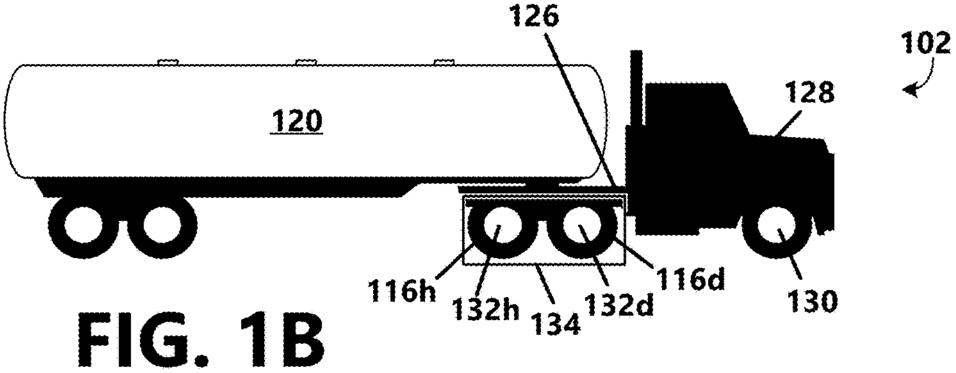
FIG. 1B is a side view of the vehicle of FIG. 1A in which the tire wear torque control system may be implemented according to examples.

FIGS. 1A and 1B illustrate a conceptual top view and side view, respectively, of a vehicle 102 employing an example tire wear torque control system 105 according to examples of the present disclosure. In some implementations, the vehicle 102 is a truck, such as a Class 8 truck. However, the methods and systems can be used by vehicles 102 of different types and/or sizes. For instance, aspects of the disclosed subject matter may have wide application and, therefore, may be suitable for use with other types of vehicles, such as passenger vehicles, buses, light, medium, and heavy-duty vehicles, motor homes, etc. Accordingly, the following descriptions and illustrations herein should be considered illustrative in nature and, thus, not limiting of the scope of the claimed subject matter. The vehicle 102 includes a cab 128 mounted to a chassis 126 supported by wheels 130 of a front wheel assembly and driving wheels 132*a*-132*h* (collectively, wheels 132) of a rear wheel assembly. In some examples, the vehicle 102 is articulatedly connected to a trailer 120 by a trailer coupling 118, such as, for example, a "fifth wheel", to form a tractor-trailer combination as depicted in FIG. 1B.

In examples, the vehicle 102 has a 6×4 configuration, where the rear wheel assembly is a tandem drive axle assembly 134, and both a front axle 114 and a rear axle 124 of the rear wheel assembly are drive axles (tandem drive axles) that are powered to propel the vehicle 102. The tandem drive axle assembly 134 includes a front axle control system 104 that controls a transfer of torque from a power source (e.g., an internal combustion engine and/or an electric motor) to the front axle 114. Additionally, the tandem drive axle assembly 134 may include a rear axle control system 144 that controls a transfer of torque from a power source to the rear axle 124. Although the tandem drive axle assembly 134 is depicted in FIG. 1B as having a particular position in the vehicle 102, it should be understood that, e.g., front axle control system 104 and rear axle control system 144 can be located in a variety of positions within the vehicle 102. The torque may be transferred from a transmission and/or an electric drive unit. In some implementations, the front axle 114 and the rear axle 124 are electric axles (e-axles) that each has an electric motor integrated in or connected to the axle that transmits torque to the wheels 132 to propel the vehicle forward or backward. The electric motors may have an integrated transmission and be used alone to power the wheels 132, or be used in combination with a mechanical drivetrain, where the power is transmitted from an engine to the wheels 132 through a combination of gears, driveshafts, and differentials. In further examples, each of the front axle 114 and the rear axle 124 may include an electric motor operatively connected to a left side and another electric motor operatively connected to a right side of the axle such that torque may be controlled separately to each side of the front axle 114 and rear axle 124.

According to examples of the present disclosure, the tire wear torque control system 105 includes various sensors 106, a powertrain controller 108 including or in communication with a tire wear torque controller 110, and the tandem drive axle assembly 134 including the front axle 114 and rear axle 124 on which sets of tires 116*a*-116*h* are mounted.

In some examples, the front axle 114 and rear axle 124 are each coupled to two pairs of wheels 132. For instance, a first set of wheels 132*a*-132*b* may be coupled to a left side of the front axle 114 and a second set of wheels 132*c*-132*d* may be coupled to a right side of the front axle 114. Additionally, a third set of wheels 132*e*-132*f* may be coupled to a left side of the rear axle 124 and a fourth set of wheels 132*g*-132*h* may be coupled to a right side of the rear axle 124. A drive tire 116*a*-116*h* (collectively, tire 116) is mounted onto each wheel 132. For instance, a first set of tires 116*a*-116*b* are mounted on the first set of wheels 132*a*-132*b*, a second set of tires 116*c*-116*d* are mounted on the second set of wheels 132*e*-132*f*, a third set of wheels 132*e*-132*f* are mounted on the third set of wheels 132*e*-132*f*, and a fourth set of tires 116*g*-116*h* are mounted on the fourth set of wheels 132*g*-132*h*.

In examples, the various sensors 106 include a front axle output speed sensor, a rear axle output speed sensor, a tire pressure sensor, air suspension system bellow pressure sensors, a yaw sensor, and an ambient temperature sensor. In further examples, the sensors 106 include individual wheel speed sensors, various sensors related to vehicle dynamics in addition to yaw rate sensors, such as steering angle sensors and lateral acceleration sensors, accelerometer sensors, Anti-lock Braking System (ABS) and Traction Control System (TCS) control sensors, and/or other sensors.

The powertrain controller 108 is a control module that performs control functions for components of the vehicle's powertrain system. For instance, the powertrain controller 108 may control functions of the engine, transmission, emissions system, hybrid or electric drivetrain components, etc. According to examples, the tire wear torque controller 110 receives and monitors inputs from the various sensors 106 to determine a balanced tire wear torque bias factor. In some examples, the balanced tire wear torque bias factor is a ratio or proportion of a total torque demand that may be applied to the total torque demand between the front axle and the rear axle to mitigate uneven tire wear between the front axle and rear axle.

The powertrain controller 108 may dynamically modulate torque distribution between the front 114 and rear axles 124 of the tandem drive axle assembly 134 based on the balanced tire wear torque bias factor to reduce uneven tire wear of at least one set of the tires 116 normally experienced in vehicles 102 with tandem drive axles. For instance, torque demands based on the balanced tire wear torque bias factor are communicated to the front axle 114 and the rear axle 124 via front axle torque requests and rear axle torque requests, respectively. In some examples, a torque demand for the front axle 114 differs from a torque demand for the rear axle 124. In further examples, the torque demand for the rear axle 124 is greater than the torque demand for the front axle 114 to promote even tire wear between the front 114 and rear axles 124. In some examples, the balanced tire wear torque bias factor biases the torque demand between left and right sides of the front axle 114 and/or left and right sides of the rear axle 124 to further provide balanced wear.

Figure 2:
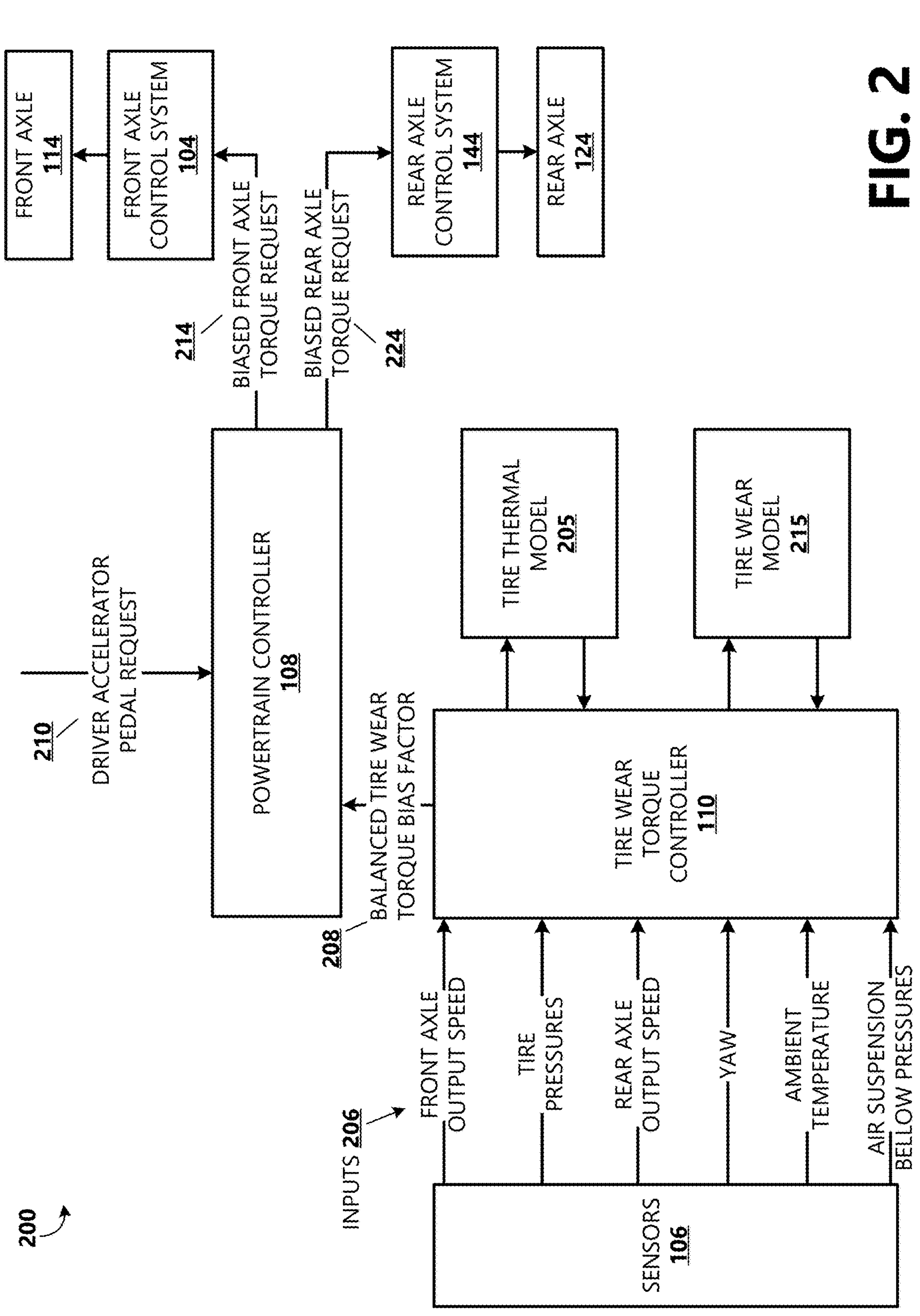
FIG. 2 is a block diagram depicting a flow of data between components of the tire wear torque control system for providing balanced tire wear torque biasing according to examples.

With reference now to FIG. 2, a block diagram is provided depicting a flow of data between components of the tire wear torque control system 105 for providing balanced tire wear torque biasing according to an example implementation. As shown, the tire wear torque controller 110 receives and analyzes inputs 206 from various vehicle sensors 106. One or a combination of inputs 206 from the sensors 106 represent operating conditions of the tandem drive axle assembly 134, and the tire wear torque controller 110 makes one or more tire wear torque biasing determinations based on one or a combination of the sensor inputs 206. In some examples, one or a combination of inputs 206 from the sensors 106 represent operating conditions of the tires 116 of the tandem drive axle assembly 134. For instance, inputs 206 from the various sensors 106 may include an output speed of the forward axle 114, an output speed of the rear axle 124, air pressures of the tires 116, air pressures of air suspension bellows positioned between suspension components corresponding to each wheel 132/tire 116 and the vehicle's chassis 126, rotational movement (e.g., a yaw rate) of the vehicle 102 around its vertical axis, an ambient temperature, etc. In some implementations, information about the operating conditions of the tandem drive axle assembly 134 (e.g., including the tires 116) is tracked over a duration (e.g., a lifetime of the tires 116 on the vehicle 102).

In some examples, a tire wear torque biasing determination includes a determination as to whether conditions are favorable for triggering tire wear torque biasing. For instance, the yaw rate of the vehicle 102 may be used to determine whether the vehicle 102 is operating in a steady state, and thus, favorable for biasing torque demand. For instance, balanced tire wear torque biasing may not be applied under certain operating conditions (such as while the vehicle is turning more than a specified amount, under heavy loads, etc.). When the vehicle is operating in a steady state, the tire wear torque controller 110 may use sensor inputs 206, algorithms, and mathematical models (e.g., a tire thermal model 205 and a tire wear model 215) to determine a balanced tire wear torque bias factor 208 to reduce or mitigate one or more uneven tire wear conditions, and thus, uneven tire wear.

In some examples, one or more of the sensor inputs 206 or the corresponding operating conditions are used as parameters for obtaining information from the tire thermal model 205 and tire wear model 215 and determining the balanced tire wear torque bias factor 208. The tire thermal model 205 may be a mathematical representation of heat generation and distribution within the tires 116 during their operation, and the tire wear model 215 may be a mathematical representation that estimates/predicts degradation and wear patterns of the tires 116 over their lifespan. In examples, the tire thermal model 205 includes various information and factors related to thermal behavior of the tires 116. For instance, the tire thermal model 205 provides information that allows the tire wear torque controller 110 to bias torque delivery between the front axle 114 and rear axle 124 in consideration of a thermal state of the tires 116. In further examples, the tire wear model 215 includes various information and factors related to wear behavior of the tires 116. For instance, the tire wear model 215 provides information that allows the tire wear torque controller 110 to bias torque delivery between the front axle 114 and rear axle 124 in consideration of historic tire wear patterns, wear rates, etc.

In some examples, the sensor inputs 206 provide real-time data on the operating conditions and behavior of the tires 116, which can be provided as parameters in the models to make predictions and estimations of tire wear and to further calculate a tire wear torque bias factor 208 that mitigates uneven tire wear. As an example, tire air pressures may be used in the tire thermal model 205 and/or tire wear model 215 to estimate tire wear of individual tires 116, air suspension bellow pressures may also be used to determine axle and/or tire loading, the speeds and distances traveled by the tires 116 may be used to estimate the wear rate and uneven tire wear, acceleration data (e.g., during braking, cornering, and acceleration events) may be used to account for forces acting on the tires 116 and their impact on uneven tire wear, and vehicle dynamics data may be used to understand factors that affect uneven tire wear, such as tire loading, slip angles, etc. By considering tire characteristics represented in the tire thermal model 205 and the tire wear model 215 and operating conditions of the tires 116 and axles, the tire wear torque controller 110 can estimate a balanced tire wear torque bias factor 208 between the front axle 114 and rear axle 124 that reduces or increases torque demand to the front axle 114 or rear axle 124 to promote even tire wear and mitigate uneven tire wear.

In examples, an accelerator pedal of the vehicle 102 may include a sensor that detects a position or movement of the accelerator pedal. When a driver of the vehicle 102 manipulates the accelerator pedal, a corresponding driver accelerator pedal request 210 indicating the driver's desired level of acceleration or torque is received by the powertrain controller 108. In examples, the powertrain controller 108 may process the driver accelerator pedal request 210 and other factors, such as engine speed, vehicle speed, and other sensor 106 readings to calculate a torque request that should be delivered to the front axle 114 and rear axle 124 to fulfill the driver's request for acceleration. In further examples, the powertrain controller 108 may apply the balanced tire wear torque bias factor 208 to the calculated torque request to determine a biased front axle torque request 214 and a biased rear axle torque request 224 that promotes even tire wear and mitigates uneven tire wear. In some cases, the powertrain controller 108 may not apply the balanced tire wear torque bias factor 208 to the calculated torque request, such as when the driver accelerator pedal request 210 is above a threshold. When biased torque requests are determined, the powertrain controller 108 communicates the biased front axle torque request 214 to the front axle control system 104, which controls a transfer of an amount of torque corresponding to the biased front axle torque request 214 from a power source to the front axle 114. Additionally, the biased rear axle torque request 224 is communicated to the rear axle control system 144, which controls a transfer of an amount of torque corresponding to the biased rear axle torque request 224 from a power source to the rear axle 124.

Figure 3:
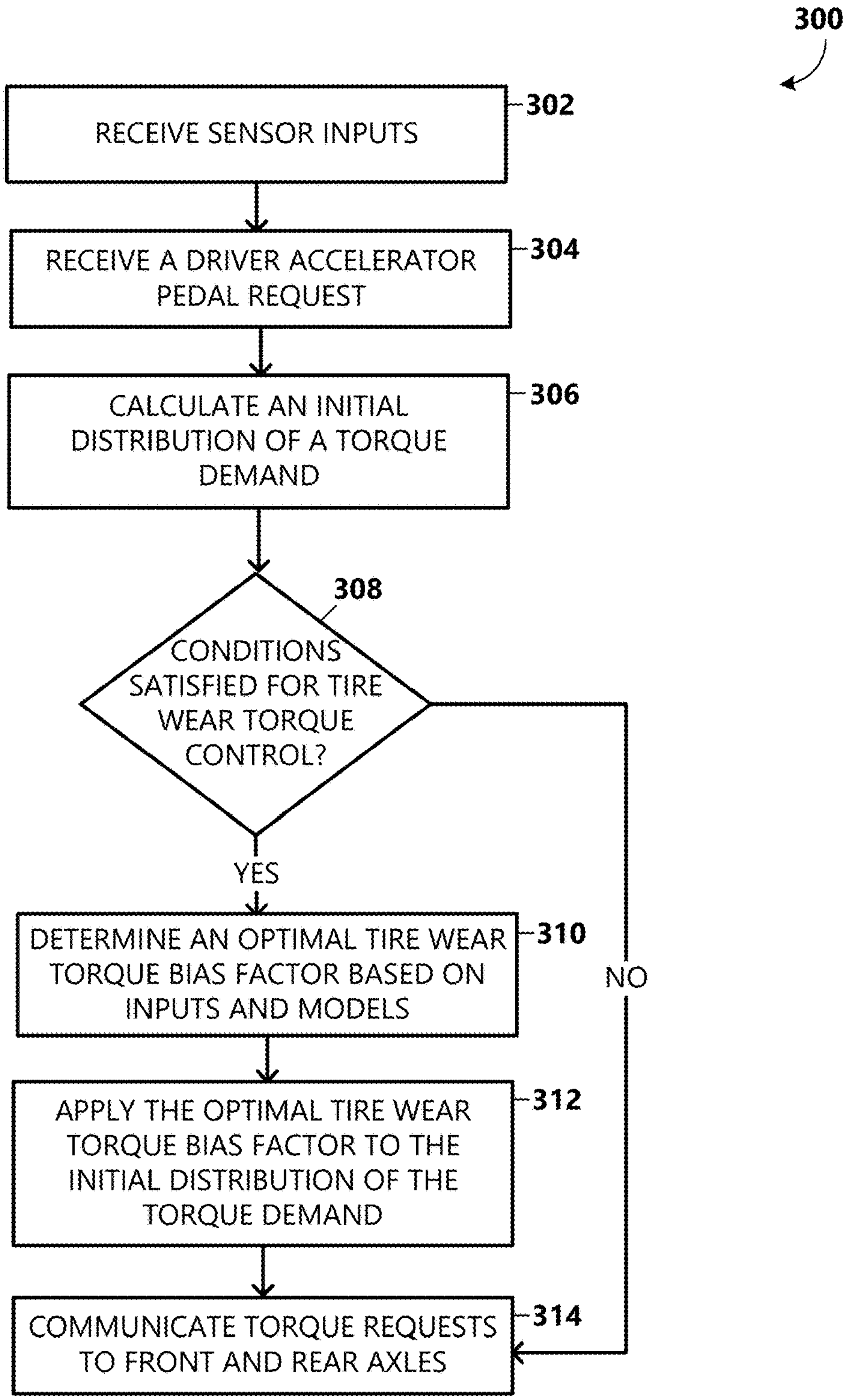
FIG. 3 is a flow diagram illustrating a method to provide tire wear torque biasing for balanced tire wear between tandem drive axles according examples.

With reference now to FIG. 3, a flow diagram is provided illustrating processing steps of an example method 300 that can be used to provide biased torque demand in a tandem drive axle system for balanced tire wear between tandem drive axles. At operation 302, various sensor inputs 206 may be received. For example, the tire wear torque controller 110 may receive various signals from various sensors 106, such as inputs of output speed of the forward axle 114, output speed of the rear axle 124, air pressures of the tires 116, air pressures of air suspension bellows, yaw rate, ambient temperature, etc.

At decision operation 304, a driver accelerator pedal request 210 indicating the driver's desired level of acceleration or torque may be received. At operation 306, the powertrain controller 108 may process the driver accelerator pedal request 210 and other factors, such as engine speed, vehicle speed, and other sensor 106 readings to calculate an initial distribution of torque that should be delivered to the front axle 114 and the rear axle 124 to fulfill the driver's request for acceleration. In some examples, the initial distribution of torque may be a ratio or proportion of a determined total torque request.

At decision operation 308, a determination may be made as to whether operating conditions are satisfied for implementing tire wear torque biasing. In some examples, a determination may be made as to whether the vehicle 102 is operating at a steady state where tire wear torque biasing may be applied. For instance, when a yaw rate and/or other sensor inputs 206 indicate the vehicle 102 is within a threshold rotational movement around its vertical axis. In other examples, other operating conditions may (also) be considered in determining whether the vehicle is operating in a sufficiently steady state to implement tire wear torque biasing, such as whether the vehicle is accelerating quickly, whether the steering wheel has been rotated from a neutral position by more than a threshold amount, whether the vehicle is under heavy load, etc. When a determination is made to not apply the balanced tire wear torque bias factor 208, the method 300 may proceed to operation 314, where the calculated front and rear axle torque requests are communicated to the front and rear axle control systems, respectively.

If it is determined that the operating conditions are satisfied for implementing tire wear torque biasing, the method 300 proceeds to operation 310, where a balanced tire wear torque bias factor 208 is determined. In examples, the tire wear torque controller 110 uses one or a combination of sensor inputs 206 and information included in the tire thermal model 205 and tire wear model 215 as parameters in one or a combination of algorithms configured to determine an operating condition of the tandem drive axle assembly 134 and a balanced tire wear torque bias factor 208 that mitigates one or more conditions of uneven tire wear, further mitigating uneven tire wear of the tandem drive axle assembly 134. In some examples, the tire wear torque controller 110 may determine, based on one or a combination of sensor inputs 206, that the current wear of one or more sets of the tires 116 is more or less than estimated (e.g., according to the tire thermal model 205 and/or tire wear model 215). For instance, a determination may be made as to whether the tires 116 of the tandem drive axle assembly 134 are experiencing more uneven tire wear than estimated or more even tire wear than estimated (e.g., based on the front and rear axles output speeds, tire pressures, air suspension bellow pressures and/or other sensor inputs 206). The tire wear torque controller 110 may adjust the balanced tire wear torque bias factor 208 based on the determination to compensate for the additional or lesser uneven tire wear. In some examples, the tire wear torque controller 110 may determine to selectively apply the balanced tire wear torque bias factor 208 at determined intervals over one or a plurality of trips to mitigate uneven tire wear over a duration of time (e.g., lifetime of the tires 116).

At operation 312, a biased front axle torque request 214 and a biased rear axle torque request 224 may be determined by applying the balanced tire wear torque bias factor 208 to the initial distribution of the torque demand. In some examples, the balanced tire wear torque bias factor 208 distributes torque demand between the front axle 114 and the rear axle 124. In further examples, the balanced tire wear torque bias factor 208 (also) distributes torque demand between the left and right sides of the front axle 114 and the rear axle 124.

At operation 314, the biased front axle torque request 214 may be communicated to the front axle control system 104 and the biased rear axle torque request 224 may be communicated to the rear axle control system 144. For instance, the biased front and rear axle torque requests may cause the front axle control system 104 and the rear axle control system 144 to control a transfer of differing amounts of torque to the front axle 114 and rear axle 124, respectively, to mitigate uneven tire wear and cause the tires 116 of the tandem drive axle assembly 134 to wear more evenly. In some examples, the biased front and rear axle torque requests (also) cause the front axle control system 104 and the rear axle control system 144 to control a transfer of differing amounts of torque to the right and left sides of each of the front axle 114 and rear axle 124 to mitigate uneven tire wear and cause the tires 116 of the tandem drive axle assembly 134 to wear more evenly.

Figure 4:
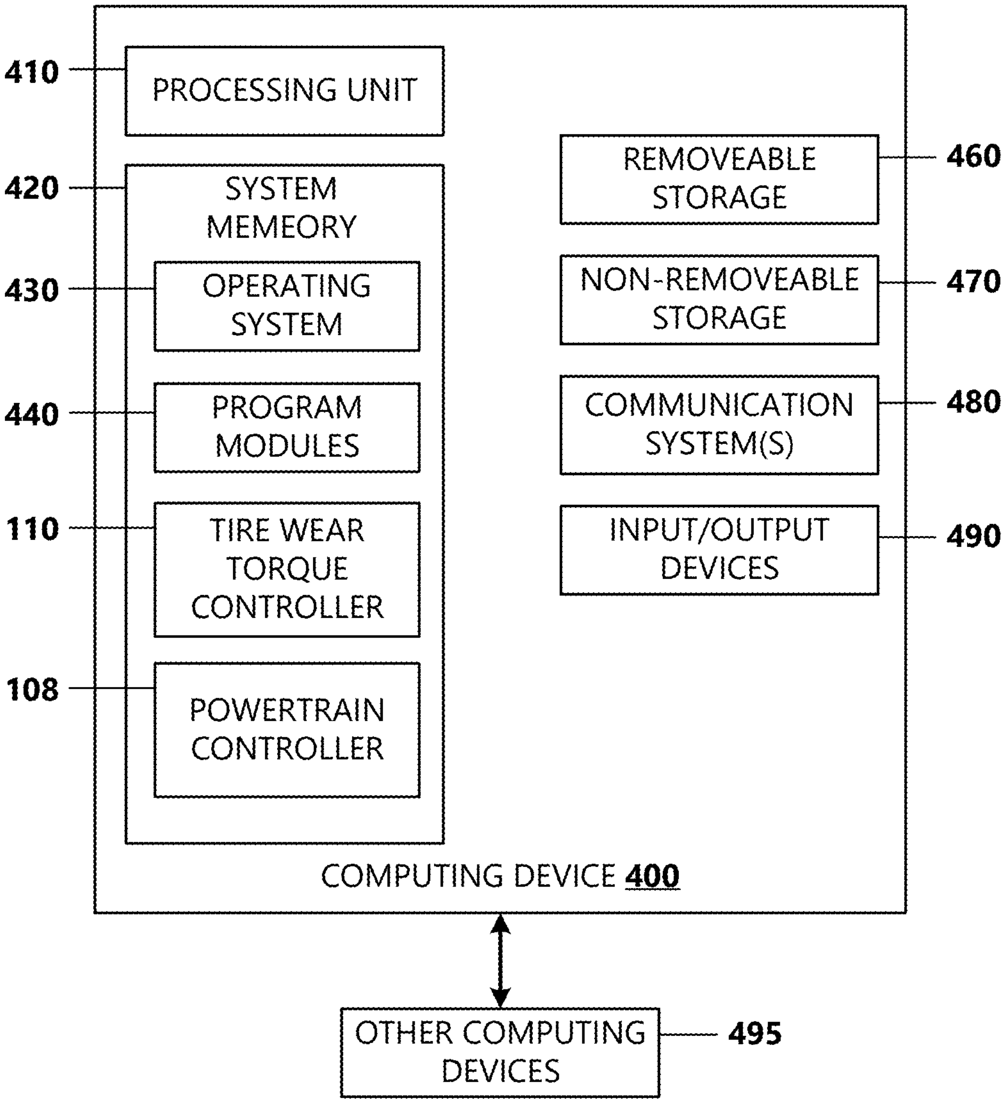
FIG. 4 is a block diagram illustrating example physical components of a computing device or system with which examples may be practiced.

FIG. 4 is a system diagram of a computing device 400 according to an example. As shown in FIG. 4, the physical components (e.g., hardware) of the computing device 400 are illustrated and these physical components may be used to practice the various aspects of the present disclosure.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for performing one or more of the operations of the methods described above for providing robust network connectivity. A number of different program modules and data files may be stored in the system memory 420. While executing on the processing unit 410, the program modules 440 may perform the various processes described above. One example program module 440 includes sufficient computer-executable instructions for the tire wear torque controller 110 and the powertrain controller 108.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, routing engines, gateways, signings systems and the like. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 400. Any such computer storage media may be part of the computing device 400. Computer storage media may be tangible and non-transitory and does not include a carrier wave or other propagated or modulated data signal.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, micro-code, etc.) may provide aspects discussed herein. Aspects may take the form of a computer program product on a computer-usable or computer-readable storage medium having computer-usable or computer-readable program code embodied in the medium for use by, or in connection with, an instruction execution system.

The description and illustration of one or more aspects provided in this application are intended to provide a thorough and complete disclosure of the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A method for providing balanced tire wear between tandem drive axles, comprising:

receiving sensor input about an operating condition of a front axle and a rear axle of a tandem drive axle assembly of a vehicle;

determining a balanced tire wear torque bias factor based on the operating condition;

receiving an acceleration request;

calculating a torque request corresponding to an amount of torque to propel the vehicle based on the acceleration request;

determining a distribution of the torque request between the front axle and the rear axle, including biasing the distribution based on the balanced tire wear torque bias factor; and requesting a biased amount of torque from the front axle and a biased amount of torque from the rear axle based on the biased distribution.

2. The method of claim 1, wherein:

the operating condition includes an amount of wear of tires of the front axle and an amount of wear of tires of the rear axle; and determining the balanced tire wear torque bias factor comprises determining a bias factor that mitigates an uneven amount of tire wear between the front axle and the rear axle.

3. The method of claim 1, wherein:

the operating condition includes an amount of wear of a set of tires on a left side and an amount of wear of a set of tires on a right side of the front axle;

the operating condition includes an amount of wear of a set of tires on a left side and an amount of wear of a set of tires on a right side of the rear axle; and determining the balanced tire wear torque bias factor comprises determining a bias factor that mitigates uneven wear between at least two of the sets of tires.

4. The method of claim 1, wherein determining the balanced tire wear torque bias factor comprises employing at least one of a tire thermal model and a tire wear model to estimate an amount of tire wear between tires of the front axle in comparison with an amount of tire wear between tires of the rear axle.

5. The method of claim 1, wherein:

the operating condition includes an amount of uneven tire wear between the front axle and the rear axle greater or lesser than an estimated amount of uneven tire wear; and adjusting the balanced tire wear torque bias factor to compensate for the greater or lesser amount of uneven tire wear.

6. The method of claim 1, wherein prior to determining the balanced tire wear torque bias factor, determining the vehicle is operating at a steady state.

7. The method of claim 1, wherein biasing the distribution based on the balanced tire wear torque bias factor comprises selectively applying the balanced tire wear torque bias factor at determined intervals over one or more trips to mitigate uneven tire wear over a duration of the one or more trips.

8. A system for providing balanced tire wear between tandem drive axles, comprising:

at least one processor; and memory coupled to the at least one processor including instructions, which when executed, cause the system to:

receive sensor input about an operating condition of a front axle and a rear axle of a tandem drive axle assembly of a vehicle;

determine a balanced tire wear torque bias factor based on the operating condition; receive an acceleration request;

calculate a torque request corresponding to the acceleration request;

determine a distribution of the torque request between the front axle and the rear axle, including by biasing the distribution of torque based on the balanced tire wear torque bias factor; and communicate a biased front axle torque request to the front axle and a biased rear axle torque request to the rear axle corresponding to the biased distribution of torque.

9. The system of claim 8, wherein:

the operating condition includes an amount of wear of tires of the front axle and an amount of wear of tires of the rear axle; and the determined bias factor represents a proportion of torque allocated to the front axle and the rear axle relative to the calculated torque request to mitigate uneven tire wear between the front axle and rear axle.

10. The system of claim 8, wherein:

the operating condition includes an amount of wear of a set of tires on a left side and an amount of wear of a set of tires on a right side of the front axle;

the operating condition includes an amount of wear of a set of tires on a left side and an amount of wear of a set of tires on a right side of the rear axle; and the determined bias factor represents a proportion of torque allocated to the left side and right side of the front axle and the left side and right side of the rear axle relative to the calculated torque request to mitigate uneven wear between at least two of the sets of tires.

11. The system of claim 8, wherein in determining the balanced tire wear torque bias factor, the instructions cause the system to employ at least one of a tire thermal model and a tire wear model to estimate an amount of tire wear between tires of the front axle in comparison with an amount of tire wear between tires of the rear axle.

12. The system of claim 8, wherein:

the operating condition includes an amount of uneven tire wear between the front axle and the rear axle greater or lesser than an estimated amount of uneven tire wear; and the instructions further cause the system to adjust the balanced tire wear torque bias factor to compensate for the greater or lesser amount of uneven tire wear.

13. The system of claim 8, wherein:

the operating condition includes at least one of:

an amount of uneven tire wear between a left side and a right side of the front axle greater or lesser than an estimated amount of uneven tire wear; or an amount of uneven tire wear between a left side and a right side of the rear axle greater or lesser than an estimated amount of uneven tire wear; and the instructions further cause the system to adjust the balanced tire wear torque bias factor to compensate for the greater or lesser amount of uneven tire wear.

14. The system of claim 8, wherein the sensor input includes at least one of:

a front axle output speed;

a rear axle output speed;

tire pressures;

a yaw rate;

an ambient temperature; and air suspension system bellow pressures.

15. A vehicle, comprising:

a plurality of sensors;

a tandem drive axle assembly, comprising:

a front axle including a first set of tires;

a rear axle including a second set of tires;

at least one controller including:

at least one processor; and a memory including instructions, which when executed by the at least one processor, cause the at least one controller to:

receive inputs from the plurality of sensors about an operating condition of the front axle and the rear axle;

determine a balanced tire wear torque bias factor based on the operating condition;

receive an acceleration request;

calculate a torque request corresponding to the acceleration request;

determine a distribution of the torque request between the front axle and the rear axle, including by biasing the distribution of torque based on the balanced tire wear torque bias factor; and communicate a biased front axle torque request to the front axle and a biased rear axle torque request to the rear axle corresponding to the biased distribution of torque.

16. The vehicle of claim 15, wherein:

the operating condition includes an amount of wear of the first set of tires and the second set of tires; and the determined bias factor represents a proportion of torque allocated to the front axle and the rear axle relative to the calculated torque request to mitigate uneven tire wear between the front axle and rear axle.

17. The vehicle of claim 15, wherein:

the operating condition includes an amount of wear of a left set of tires and an amount of wear of a right set of tires in the first set of tires;

the operating condition includes an amount of wear of a left set of tires and an amount of wear of a right set of tires in the second set of tires; and the determined bias factor represents a proportion of torque allocated to the left side and right side of the front axle and the left side and right side of the rear axle relative to the calculated torque request to mitigate uneven wear between at least two of the sets of tires.

18. The vehicle of claim 15, wherein: in determining the balanced tire wear torque bias factor, the instructions cause the at least one controller to employ at least one of a tire thermal model and a tire wear model to estimate an amount of tire wear between the first set of tires in comparison with the second set of tires.

19. The vehicle of claim 15, wherein:

the operating condition includes an amount of uneven tire wear between the first set of tires and the second set of tires greater or lesser than an estimated amount of uneven tire wear; and the instructions further cause the at least one controller to adjust the balanced tire wear torque bias factor to compensate for the greater or lesser amount of uneven tire wear.

20. The vehicle of claim 15, wherein:

the front axle and the rear axle include electric motors;

the biased front axle torque request causes the electric motor of the front axle to transmit a first amount of torque to the first set of tires; and the biased rear axle torque request causes the electric motor of the rear axle to transmit a second amount of torque to the second set of tires.

* * * * *